May 23, 1939.　　W. T. DUNN ET AL　　2,159,429
POWER TRANSMISSION
Filed Oct. 24, 1936　　2 Sheets-Sheet 2
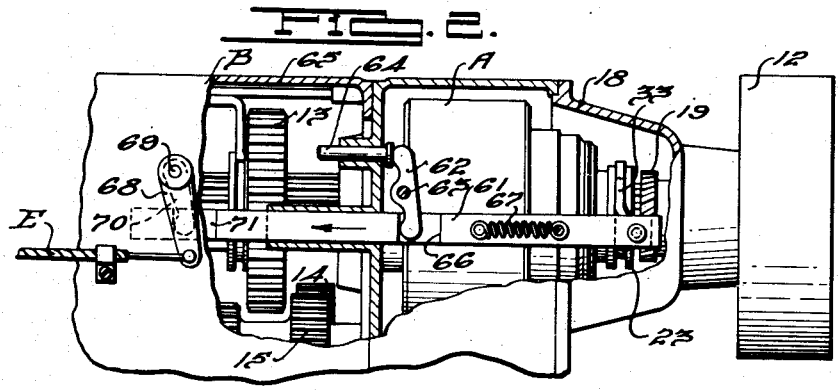
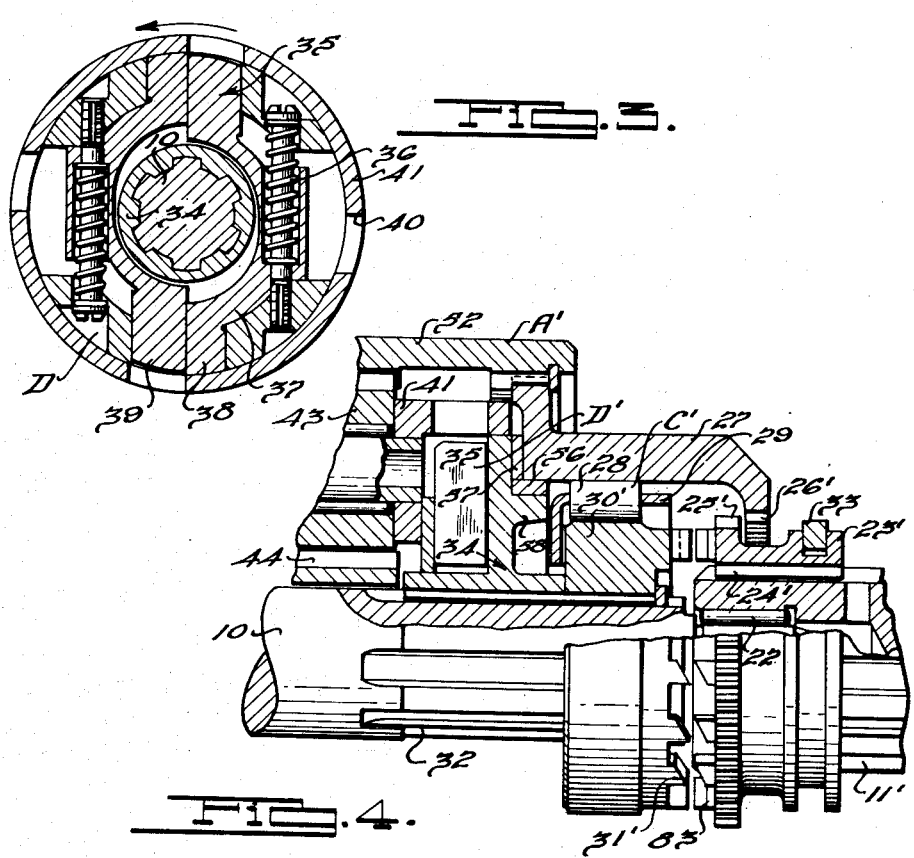
INVENTORS.
William T. Dunn,
Augustin J. Syrovy,
BY Roy T. Bucy.
ATTORNEYS.

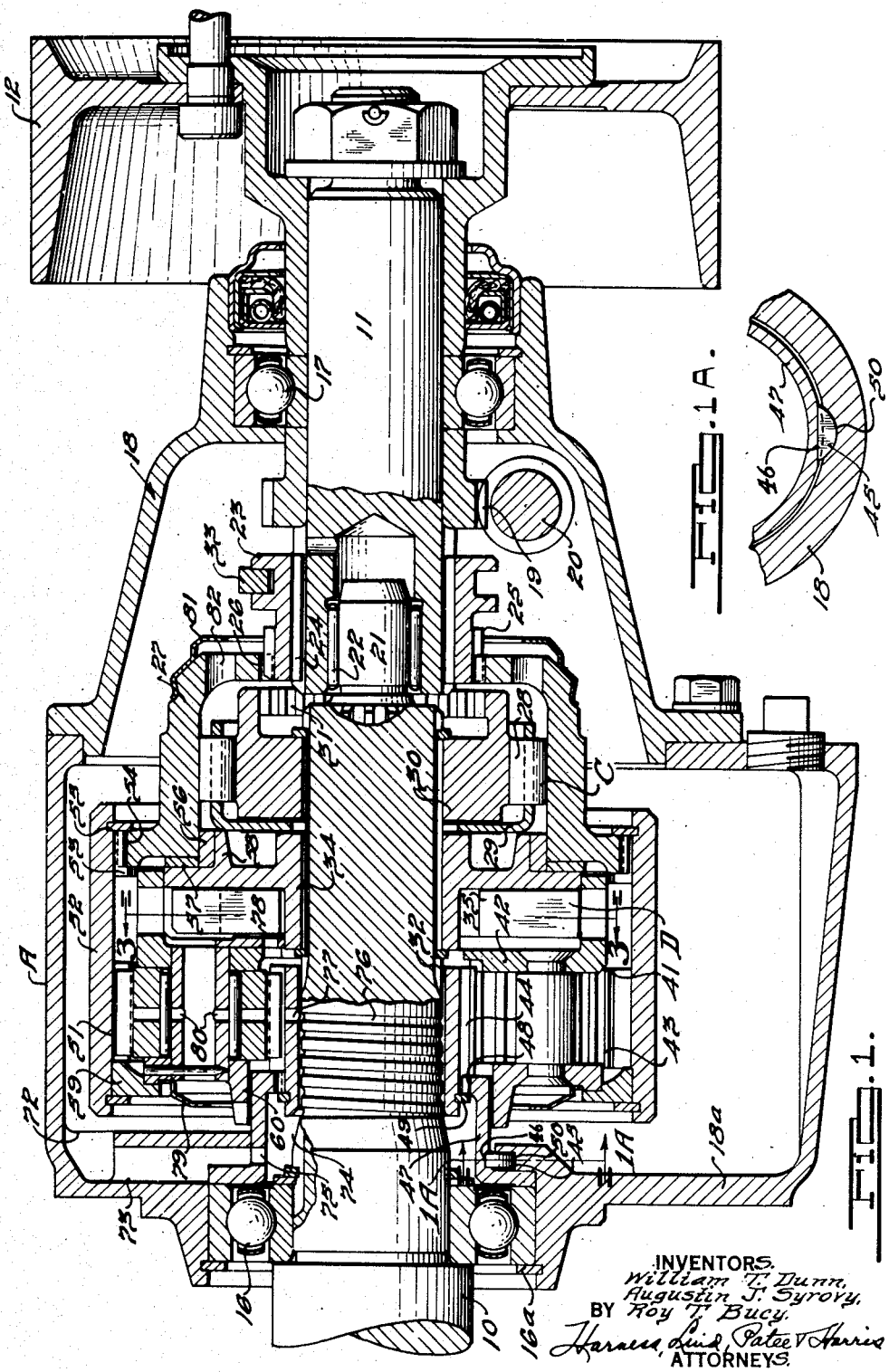

Patented May 23, 1939

2,159,429

UNITED STATES PATENT OFFICE 2,159,429

POWER TRANSMISSION

William T. Dunn, Augustin J. Syrovy, and Roy T. Bucy, Detroit, Mich., assignors to Chrysler Corporation, Highland Park, Mich., a corporation of Delaware Application October 24, 1936, Serial No. 107,428

19 Claims. (Cl. 74—260)

This invention relates to power transmissions and refers more particularly to improvements in speed ratio changing mechanism especially adapted for use in driving motor vehicles.

One object of our invention is to provide an improved speed ratio changing mechanism preferably providing an overdrive, or a speed greater than 1 to 1 between driving and driven shafts in the transmission of power from the engine to the vehicle ground wheels.

More particularly, further objects of our invention are to provide a mechanism of the character aforesaid having improved characteristics of long life, quietness of operation, automatic response to the vehicle travel, and relatively low manufacturing cost.

Another object of our invention is to provide an improved arrangement of planetary gearing for the overdrive gear train and other movable parts whereby certain members are more substantially supported and positioned, resulting in a quieter gear train and a more rugged mechanism.

A further object of our invention resides in the provision of a novel oiling system whereby the planetary gear and the centrifugally actuated clutch are continuously lubricated.

Another object of our invention is to provide a novel overdrive mechanism preferably employing a shiftable clutch having synchronizing teeth which will provide a direct two-way drive between the driving and driven shafts when shifted. In addition, this shiftable clutch is preferably so arranged that it can be shifted to synchronize the driving and driven shafts from a condition of overdrive.

Further objects and advantages of our invention will be more apparent from the following detailed description of several illustrative embodiments of our invention, reference being had to the accompanying drawings, in which:

Fig. 1 is a sectional elevational view of our overdriving mechanism.

Fig. 1A is a detail sectional view taken approximately as indicated by the line 1A—1A of Fig. 1.

Fig. 2 is a partial elevational view of an assembly of a conventional transmission and our overdriving mechanism with a portion of the casing broken away to show the details of the overdrive control.

Fig. 3 is a transverse sectional elevational view through the automatic clutch taken approximately as indicated by the line 3—3 in Fig. 1.

Fig. 4 is a partial sectional elevational view corresponding to Fig. 1 but illustrating a modified form of our overdriving mechanism.

Referring to the drawings, we have illustrated our overdriving mechanism A interposed between a driving shaft 10 coming from a speed ratio changing transmission B illustrated in Fig. 2, and a driven shaft 11, the latter extending rearwardly to drive through the usual brake drum 12 the rear wheels (not shown) of the motor car or vehicle in the usual well-known manner, it being understood that we have elected to show our invention in association with a motor vehicle drive although in its broader aspects it is not necessarily limited thereto.

Furthermore, our driving mechanism may be used to advantage at various other points in the line of general power transmission between the vehicle engine and the driven wheels, or between driving and driven means, such as shafts of other types of devices.

The transmission B may be of any suitable type, such as the conventional selector type operated in the well-known manner through usual selector controls whereby the various adjustments may be made to the transmission in order to provide speed ratios including reverse, in the line of drive through the transmission.

Inasmuch as transmission B may, for the most part, be of general conventional construction and operation, we have shown only a portion of the gearing of this transmission in Fig. 2 wherein 13 represents a low speed and reverse gear adapted to be shifted by the usual reverse control rearwardly or to the right, as viewed in Fig. 2, for engagement with the usual reverse idler 14 in order to effect a reverse drive from the normal direction of drive to the driven shaft 11. This idler gear 14 constantly meshes with the usual countershaft reverse gear 15. Thus, by appropriate actuation of the usual transmission controls, gears 13 and 14 may be engaged to reverse the drive, it being understood that other manipulations of the transmission mechanism are adapted to selectively produce other desired speed ratio changes in the normal direction of rotation for driven shaft 11.

The power coming from the usual engine or prime mover (not shown) which may be located forwardly of transmission B, drives the transmission and the power is taken from this transmission by the driving shaft 10.

In Fig. 1 the driving shaft 10 is suitably journalled, one bearing therefor being shown at 16, while driven shaft 11 is rotatably journalled by a bearing 17 mounted in a casing 18, the usual speedometer drive being taken from shaft 11 by gearing 19 and 20 in a well-known manner. The driven shaft 11 pilots the rearward end 21 of the driving shaft 10 which is centered therein by a bearing 22.

A shiftable clutch 23 is slidably mounted on one of the shafts, such as shaft 11, and is continuously drivingly connected with said shaft by splines 24. This clutch 23 has teeth 25 engageable with teeth 26 of a cylindrical driven member 27 of the overrunning clutch C, the latter having cylinders 28 separated by spacers 29 and a driving inner cam member 30. In this instance this cam member 30 has teeth 31 and is driven from shaft 10 by splines 32 thereof, teeth 31 being engageable with teeth 25 of shiftable clutch 23 when the latter is moved forwardly by an arm 33 to lock out the overrunning clutch.

Forwardly of cam member 30 is a pawl cage 34 carrying one or more pawls 35 of the automatic clutch D, the spacer 29 of the overrunning clutch C having an extension positioned therebetween.

This automatic clutch may be of the type having a driving and a driven clutching structure respectively connected to the driving and driven shaft 10 and 11, one of said clutching structures including a cage and one or more centrifugally actuated pawls carried by the cage.

The pawls 35 are yieldingly urged inwardly to their disengaged or declutched positions by springs 36. At a predetermined desired speed of rotation of the pawls, centrifugal force will cause outward movement of the pawls, overcoming the action of springs 36, whereby the pawls will be projected for engaged or clutched positions. Each pawl 35 may have a yoke portion 37 extending partially around shaft 10 and terminating in a counterbalancing guide end portion 38 substantially diametrically opposite the clutching end portion 39 of each pawl.

Slots 40 of shell 41 are driven by a planet carrier 42 having planet gears 43 meshing with a sun gear 44.

We have provided a novel holding means by which the sun gear 44 is prevented from rotating by the casing 18. This consists, in this particular embodiment, of one or more keys 45, one of which is shown in Figs. 1 and 1A, insertable in a recess 46 carried by an extension 47, the rearward portion of said extension having teeth 48 meshed to the sun gear 44 and locked thereon against fore and aft movement by a suitable lock ring 49, the forward portion of said extension being positioned against the stationary portion of the bearing 16 held against forward movement by a lock ring 16ª. The key 45, best shown in Fig. 1A, also is adapted to be received within a cooperating recess 50 in the casing 18 to anchor the extension 47 against rotation and rearward movement, while the bearing 16 prevents forward movement thereof. Thus, in the assembly of my overdriving mechanism the key 45 may be inserted in the recess 46 of extension 47 and, with the lock ring 49 and sun gear 44, slipped into the casing 18 so that this key registers in the casing recess 50, thereby holding extension 47 against rotation and rearward movement. Thereafter the lock ring 16ª can be assembled to the casing 18 to prevent forward movement of the bearing 16, extension 47, and sun gear 44.

Planet gears 43 also mesh with an annular internal gear 51 of a cooperating cylindrical driving member 52, said member 52 being drivingly connected with member 27.

We have provided, according to the illustrated embodiment of our invention, a novel and inexpensive means for locating and supporting the annulus gear 51 on the member 27, consisting of full size internal teeth 53 on the inner surface of member 52 being circumferentially cut at the rearward portion thereof to increase the inner diameter of the teeth 53. Thereby the external teeth 54 of the member 27 may be drivingly connected with teeth 53, the outer end portions of the full size teeth 53 serving as a shoulder to prevent forward movement of member 27 while a suitable snap-ring 55 operating in a groove in member 52 prevents rearward movement of member 27. Annular bearings 56 and 57 are preferably carried by the pawl cage 34 to respectively support the members 52 and 27 and to take any forward thrust of member 27, which at times rotates at a speed different than cage 34.

Our pawl cage 34 is of improved construction, having a rearwardly extending flange portion 58 to carry the bearing 56 while the vertical portion of cage 34 positions forwardly the bearing 57.

The member 52, according to the illustrated embodiment of our invention, is drivingly connected to an annular member 59 journalled by the planet carrier 42. The planet carrier 42 has a forwardly extending flange 60 by which it is journalled on the extension 47 of the sun gear 44.

The planetary gear set is thus adapted to rotate slots 40 from the driven shaft 11, through clutch 23 and members 27 and 52, at a speed less than that of the pawls 35 which are directly driven from the shaft 10. With clutch 23 positioned as in Figs. 1 and 2, shaft 10 directly drives shaft 11 through the overrunning clutch C until, at or above the critical speed, pawls 35 are projected outwardly for engagement with slots 40, and such engagement will occur when the slots and pawls are substantially synchronized.

Synchronization is provided for by decreasing the speed of the driving shaft, as by releasing the usual accelerator pedal, and allowing the driven shaft to overrun the driving shaft by reason of the overrunning clutch C.

When clutch D engages for providing a two-way positive drive through the planetary gear train, the overrunning clutch C is ineffective and continues to be so until the pawls are retracted by reason of their rotation below the critical speed.

A means for shifting clutch 23 forwardly has been provided which consists of the shifter arm 33, best shown in Fig. 2, being fixed to a horizontal shifter rail 61 which is slideably mounted in the casing 18. A lever 62, carried by the casing 18, is pivotally supported at 63, its upper face contacting an actuating rod 64 carried by a casing 65 of the transmission B and casing 18, said rod 64 being in the path of gear 13, while the forward lower face of lever 62 contacts a large slot 66 in the rail 61. The rail 61 is yieldingly urged rearwardly by a spring 67, which has its rearward end attached to casing 18, rail 61 being moved rearwardly whenever gear 13 is not engaged for reverse drive and whenever some other remote control, such as a dash control, is not actuated.

A further means for shifting clutch 23 has been incorporated which is independent of the aforementioned reverse gear control. An arm 68 is mounted outside of casing 65 on a pivotal shaft 69 which extends through the casing, the lower portion of arm 68 having attached thereto a suitable remote control E, such as a Bowden wire dash control. Inside the casing 65 on the end of shaft 69 is mounted a lever 70, its forward face contacting a large slot 71 in the rail 61.

Referring to the operation of our overdriving mechanism A, as thus far described, when the parts are positioned as in Figs. 1, 2 and 3, the driving shaft 10 releasably and directly drives the driven shaft 11 through the members 30 and 27 of the overrunning clutch C, the drive passing from member 27 to the clutch 23, other conditions permitting such action, as will be presently apparent.

However, when the automatic clutch D is engaged the drive between driving shaft 10 and driven shaft 11 will be accomplished with an overdrive action or increase in speed of the driven shaft over the driving shaft through automatic clutch D, planet gears 43, annulus gear 51, cylindrical members 52, 27 and clutch 23.

Forwardly shifting of clutch 23 is effected when gear 13 is moved to reverse drive. The arrangement is such that when the gear 13 is shifted into engagement with gear 14 for establishing the reverse drive, providing the remote control E is positioned as shown in Fig. 2, rod 64 will be engaged toward the latter part of the movement of gear 13 to move rail 61 forwardly or to the left, thereby shifting clutch 23 forwardly to engage teeth 25 and 31 to lock out or render the automatic clutch D inoperative and the overrunning clutch C ineffective, and providing a two-way direct drive between shafts 10 and 11. During the aforesaid movement of rail 61, spring 67 will be stretched so that on release or forward movement of gear 13, the parts will be restored to positions thereof illustrated provided, however, that the remote control E is in its Fig. 2 position.

The operation of the remote control E to shift clutch 23 forwardly is independent of the reverse gear control previously described. When the remote control is actuated, providing the reverse gear 13 is not engaged, arm 68 will move forwardly with lever 70, thereby causing the rail 61 to shift clutch 23 forwardly. If the remote control is actuated when the reverse gear 13 is engaged, the lever 70 will merely move within the slot 71. In the event that the reverse gear 13 is shifted into engagement while the remote control E is already actuated, the lever 62 will merely move within the slot 66.

Referring again to Fig. 1, we have illustrated in this particular embodiment of our invention, a novel and efficient lubrication system for planetary gear trains and automatic clutch assemblies.

Formed on the lower side of the casing 18 is a sump portion 18ᵃ which is adapted to carry lubricating oil so that the bottom portion of the cylindrical driving member 52 will be continuously in contact with the lubricant while operating.

The upper forward portion of the inside of the casing 18 is provided with a chamber opening 72, the chamber 73 extending inwardly thereof. Extension 47 connects chamber 73 and a trap 74 through an aperture 75. An oil groove 76 winds spirally rearwardly counter-clockwise around shaft 10 from the trap 74 to a passage 77 in the sun gear 44. An annular series of channels 78 is provided in the carrier 42 to conduct lubricant from the teeth of sun gear 44 to the pawls 35 of the automatic clutch D. An inwardly extending annular flange 79 is mounted on the forward outer portion of the carrier 42 just outside the hollow shafts of the planet gears 43, while apertures 80 extend outwardly from these hollow shafts to the planet gear teeth but not passing through the planet gear bearings. An annular flange 81, similar to flange 79, is mounted on the rear outer portion of the member 27 just outside an annular series of substantially horizontal passages 82 in said member which lead to the overrunning clutch C.

In the operation of our lubrication system just described, oil is picked up from the sump portion 18ᵃ and thrown in a steady stream from rotatable member 52 to opening 72 of chamber 73, as the transmission B and overdriving mechanism A are normally tilted downwardly and rearwardly with respect to the horizontal. This stream is directed at the opening 72 where it then passes by force down the chamber 73 and through the aperture 75 into trap 74. The lubricant is fed therefrom into the groove 76 and is thereby carried to the passage 77 where it flows on the teeth of the planet gears 43, from whence it works out along these teeth to the sides of the planet gears while some passes outwardly through the apertures 80 to lubricate the bearings of the planet gears. The lubricant which emanates from the rearward sides of the planet gears passes through the channels 78 to lubricate the automatic clutch D.

The flange 79 catches a quantity of oil and guides it rearwardly into the hollow shafts of the planet gears 43 where it may then pass through the apertures 80 to further lubricate the planet gear bearings and the annulus gear 51.

When the overdriving mechanism A is in operation, the flange 81 catches a quantity of oil and passes it forwardly through the passages 82 to the members of the overrunning clutch C.

Thus, it is evident that the illustrated overdriving mechanism A is efficiently lubricated at all times, particularly the planetary gear train, the automatic clutch D, and the overrunning clutch C.

Referring now to Fig. 4 in which we have shown another embodiment of our invention, the construction and operation of the overdriving mechanism therein is substantially like that of Figs. 1, 2 and 3 except that a clutch having synchronizing teeth has been substituted to render the overrunning clutch C and the automatic clutch D ineffective. We have indicated by primed reference characters parts of similar operation but different construction.

A shiftable clutch 23' is slidably mounted on shaft 11', and is continuously drivingly connected with said shaft by splines 24'. This clutch 23' has teeth 25' engageable with teeth 26' of cylindrical driven member 27 and also teeth 83 formed on the forward portion thereof.

The cam member 30' has teeth 31' formed on its rearward portion, teeth 31' being engageable with teeth 83 of shiftable clutch 23' when the latter is moved forwardly by arm 33 to render ineffective the overrunning clutch C and the automatic clutch D.

The cooperating clutch teeth 31' and 83 are of the synchronizing type in this embodiment. The direction of rotation of shaft 10 and cam member 30' is clockwise when looking rearwardly. Therefore each tooth 31' has been tapered off oppositely to its direction of rotation. On the other hand, each tooth 83 has been tapered opposite to teeth 31'.

In the operation of the Fig. 4 mechanism, the clutch 23' may be shifted forwardly to engage teeth 83 with teeth 31' at any speeds of shafts 10 and 11', preferably when the automatic clutch D is disengaged. Thus the clutch 23' may be shifted forwardly by a suitable remote control of the type previously described, without any objectionable jar. If the driven shaft 11' is rotating faster than the driving shaft 10, the teeth 83 will be moved toward engagement and cam quietly off the teeth 31', and finally engage therewith when the rotational speed of shaft 10 has been brought up to that of shaft 11'.

With the overdriving mechanism A' illustrated in Fig. 4 the driven shaft 11' is never driven slower than the driving shaft 10. This is effected by reason of the over-running clutch C' permitting a direct drive between the driving and driven shafts when the automatic clutch D' is not engaged, and releasing said direct drive whenever the speed of the driven shaft exceeds that of the driving shaft. When the automatic clutch is engaged to effect a two-way direct drive through the planetary gearing, the driven shaft is driven at a speed greater than that of the driving shaft, and the overrunning clutch C' is rendered ineffective. Hence, the teeth 83 formed on clutch 23', which is drivingly connected to the driven shaft 11', are always rotated at a speed equal to or greater than that of the clutch teeth 31' which are drivingly connected to the driving shaft 10. It is thus possible to have the teeth 31' taper off oppositely to the direction of rotation of the driving shaft 10 and to taper the teeth 83 oppositely to the taper on teeth 31'. Thus, when rotating faster, teeth 83 may quietly cam off teeth 31' until synchronized, at which time the clutch 23' can be completely shifted to engage teeth 83 and 31'. In other words, the driving shaft is never rotated faster than the driven shaft so that the tapered portions of teeth 31' would knock off the tapered portions of teeth 83 when clutch 23' is shifted.

Furthermore, our driving mechanism A' permits shifting of the clutch 23' without damaging the clutch teeth 31' and 83 when the automatic clutch D' is engaged. It will be noticed that when driving through the overrunning clutch C' or the automatic clutch D', teeth 25' of the clutch 23' are drivingly connected with the teeth 26' of the cylindrical member 27. However; when clutch 23' is shifted forwardly to cause the tapered portions of the teeth 31' and 83 to contact each other, teeth 25' are first disengaged from teeth 26'. Thus, when automatic clutch D' is engaged to drive the driven shaft through the planetary gearing at a speed greater than the driving shaft, the clutch 23' can be shifted forwardly until the teeth 25' and 26' are disengaged, whereupon the teeth 83 cam quietly on teeth 31' to synchronize their speed of rotation before completely engaging.

Synchronism of the driving and driven shafts 10 and 11' respectively, during the shifting of clutch 23', is effected by the teeth 31' and 83 of my driving mechanism A'. If, for example, the vehicle is driven through the overrunning clutch C' and the driven shaft overruns the driving shaft, the clutch 23' can be shifted satisfactorily inasmuch as the teeth 83 of the faster rotating driven shaft 11' cam over the teeth 31' of the slower rotating driving shaft 10, causing the driving shaft 10 to increase its speed of rotation to synchronize with shaft 11', whereupon the shifting of clutch 23' can be completed to engage the synchronized teeth 31' and 83 to provide a direct two-way drive through the driving mechanism A' and to render the overrunning clutch C' and automatic clutch D' ineffective.

We do not limit our invention in the broader aspects thereof to the particular construction and arrangement of parts shown and described for illustrative purposes since various modifications will be apparent from the teachings of our invention as defined in the appended claims.

What we claim is:

1. In a power transmission mechanism, a driving shaft, a driven shaft, means operably connecting said shafts for a direct drive therebetween, an internal gear concentrically surrounding said driving shaft, means providing a driving connection between said internal gear and said driven shaft, means for drivingly connecting said driving shaft with said internal gear for driving said driven shaft at a speed ratio different from said direct drive, said speed ratio driving means including driving and driven clutching structures adapted to control said speed ratio drive, one of said clutching structures having a portion thereof rotatably journalling said internal gear connecting means, said clutching structure portion being continuously supported by and centered on one of said shafts.

2. In a power transmission mechanism, a driving shaft, a driven shaft, means operably connecting said shafts for a direct drive therebetween, an internal gear concentrically surrounding said driving shaft, means providing a driving connection between said internal gear and said driven shaft, means for drivingly connecting said driving shaft with said internal gear for driving said driven shaft at a speed ratio different from said direct drive, said speed ratio driving means including driving and driven clutching structures adapted to control said speed ratio drive, said speed ratio driving means including a planetary gear and a carrier therefor, said planetary gear meshing with said internal gear, means providing a journal support for said carrier, and means for rotatably supporting said internal gear on said carrier.

3. In a power transmission mechanism, a driving shaft, a driven shaft, means operably connecting said shafts for a direct drive therebetween, an internal gear concentrically surrounding said driving shaft, means providing a driving connection between said internal gear and said driven shaft, means for drivingly connecting said driving shaft with said internal gear for driving said driven shaft at a speed ratio different from said direct drive, said speed ratio driving means including driving and driven clutching structures adapted to control said speed ratio drive, said speed ratio driving means further including a planetary gear and a carrier therefor, said planetary gear meshing with said internal gear, means providing a journal support for said carrier, and means for rotatably supporting said internal gear on said carrier, one of said clutching structures having a portion thereof rotatably journalling said internal gear connecting means.

4. In a power transmission mechanism, a driving shaft, a driven shaft, means operably connecting said shafts for a direct drive therebetween, an internal gear concentrically surrounding said driving shaft, means providing a driving connection between said internal gear and said driven shaft, means for drivingly connecting said driving shaft with said internal gear for driving said driven shaft at a speed ratio different from said direct drive, said speed ratio driving means including driving and driven clutching structures adapted to control said speed ratio drive a centrifugal force operated pawl movably carried by one of said clutching structures for positive clutching engagement with the other of said clutching structures, means for continuously supporting and centering said pawl carrying clutching structure on one of said shafts, said pawl carrying clutching structure having a portion thereof rotatably journalling said internal gear connecting means.

5. In a power transmission mechanism, a driving shaft, a driven shaft, means operably connecting said shafts for a direct drive therebetween, an internal gear concentrically surrounding said driving shaft, means providing a driving connection between said internal gear and said driven shaft, means for drivingly connecting said driving shaft with said internal gear for driving said driven shaft at a speed ratio different from said direct drive, said speed ratio driving means including driving and driven clutching structures adapted to control said speed ratio drive, a centrifugal force operated pawl movably carried by one of said clutching structures for positive clutching engagement with the other of said clutching structures, said pawl carrying clutching structure having a portion thereof rotatably journalling said internal gear connecting means, and means providing a continuous mounting for said pawl carrying clutching structure on said driving shaft for driving connection therewith.

6. In a power transmission mechanism, a driving shaft, a driven shaft, means operably connecting said shafts for a direct drive therebetween, an internal gear concentrically surrounding said driving shaft, means providing a driving connection between said internal gear and said driven shaft, means for drivingly connecting said driving shaft with said internal gear for driving said driven shaft at a speed ratio different from said direct drive, said speed ratio driving means including driving and driven clutching structures adapted to control said speed ratio drive, said speed ratio driving means further including a planetary gear and a carrier therefor, said planetary gear meshing with said internal gear, said speed ratio driving means further including a relatively stationary sun gear meshing with said planetary gear, said sun gear having a hub surrounding said driving shaft and providing a journal support for said carrier, and means for rotatably supporting said internal gear on said carrier.

7. In a power transmission mechanism, a drive shaft, a driven shaft, releasable clutch means intermediate said shafts for driving said driven shaft directly from said driving shaft and for releasing said direct drive to permit said driven shaft to overrun said driving shaft, means operable between said shafts for driving said driven shaft at a speed ratio different than the speed of the driving shaft, said speed ratio driving means including planetary gearing and a clutch, said clutch comprising clutching members relatively movable toward each other for automatically controlling said speed ratio drive, a support for one of said clutching members, said gearing including a sun gear, a planet carrier carrying a plurality of planet gears, and an annulus gear, said annulus gear being rotatably supported on said planet carrier and said clutching member support.

8. In a power transmission mechanism, a drive shaft, a driven shaft, releasable clutch means intermediate said shafts for driving said driven shaft directly from said driving shaft and for releasing said direct drive to permit said driven shaft to overrun said driving shaft, means operable between said shafts for driving said driven shaft at a speed ratio different than the speed of the driving shaft, said speed ratio driving means including planetary gearing having a planetary gear and a relatively stationary sun gear meshing therewith, said sun gear having a hub extending axially thereof, and a carrier for said planetary gear rotatably journalled on said sun gear hub, said planetary gearing also having an internal gear meshing with said planetary gear and journalled on said carrier.

9. In a power transmission of the character described, a lubricant-receiving casing having a transverse wall formed with an opening therethrough and having a lubricant conducting passageway extending outwardly from said opening, a driving shaft extending through said opening into said casing, a driven shaft aligned with said driving shaft, planetary gearing within said casing for driving said driven shaft from said driving shaft, said gearing including a sun gear having a hub surrounding said driving shaft and fixed to said casing wall, said hub having an opening therethrough communicating with said passageway, and means for conducting lubricant from said casing to the outer end of said passageway for passage inwardly thereof and through said hub opening, said sun gear having an opening extending therethrough for conducting lubricant passing through said hub opening to lubricate said planetary gear.

10. In a power transmission of the character described, a lubricant-receiving casing having a transverse wall formed with an opening therethrough and having a lubricant conducting passageway extending outwardly from said opening, a driving shaft extending through said opening into said casing, a driven shaft aligned with said driving shaft, planetary gearing within said casing for driving said driven shaft from said driving shaft, said gearing including a sun gear having a hub surrounding said driving shaft and fixed to said casing wall, said hub having an opening therethrough communicating with said passageway, and means for conducting lubricant from said casing to the outer end of said passageway for passage inwardly thereof and through said hub opening, said sun gear having an opening extending therethrough for conducting lubricant passing through said hub opening to lubricate said planetary gearing, said driving shaft having a spiral lubricant conducting passageway between said hub and sun gear openings.

11. In a power transmission mechanism, a drive shaft, a driven shaft, means including a shiftable clutch device driven by one of said shafts and adapted to provide a direct drive between said shafts, sets of clutch teeth respectively drivingly connected to said shiftable clutch device and to the other of said shafts, and means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures respectively connected to said driving and driven members and adapted when engaged to provide a drive through said gear train, the clutch teeth of said sets having engageable faces inclined in the same direction and so constructed and arranged to prevent clutching of said sets of teeth until the rotational speeds thereof are substantially synchronized.

12. In a power transmission mechanism, a drive shaft, a driven shaft, means including a shiftable clutch device driven by one of said shafts and adapted to provide a direct drive between said shafts, sets of clutch teeth respectively drivingly connected to said shiftable clutch device and to the other of said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures respectively connected to said driving and driven members and adapted when engaged to provide a drive through said gear train, the clutch teeth of said sets having engageable faces inclined in the same direction and so constructed and arranged to prevent clutching of said sets of teeth until the rotational speeds thereof are substantially synchronized, and manually operable means for selectively shifting said clutch device into positions providing said direct drive and providing a drive from one of said shafts to one of said speed ratio members.

13. In a power transmission mechanism, a drive shaft, a driven shaft, means including a shiftable clutch device driven by one of said shafts and adapted to provide a direct drive between said shafts, sets of clutch teeth respectively drivingly connected to said shiftable clutch device and to the other of said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures respectively connected to said driving and driven members and adapted when engaged to provide a drive through said gear train, the clutch teeth of said sets having engageable faces inclined in the same direction and so constructed and arranged to prevent clutching of said sets of teeth until the rotational speeds thereof are substantially synchronized, and manually operable means for selectively shifting said clutch device into positions providing said direct drive and providing a drive from one of said shafts to one of said speed ratio members, the last said speed ratio member being released from said drive thereto when said shiftable clutch device is shifted to provide said direct drive.

14. In a power transmission mechanism, a drive shaft, a driven shaft, means including a shiftable clutch device driven by one of said shafts and adapted to provide a direct drive between said shafts, sets of clutch teeth respectively drivingly connected to said shiftable clutch device and to the other of said shafts, and means including a gear train for driving said driven shaft from said drive shaft at a speed ratio different from said direct drive, said speed ratio driving means including driven and driving members respectively adapted for driving connection with said shafts, said speed ratio driving means further including relatively movable clutching structures respectively connected to said driving and driven members and adapted when engaged to provide a drive through said gear train, said sets of clutch teeth being so constructed and arranged as to synchronize the speeds of rotation of said shafts during shifting movement of said clutch device to provide said direct drive.

15. In a power transmission mechanism, a drive shaft, a driven shaft, a releasable clutch intermediate said shafts for driving said driven shaft directly from said driving shaft and for releasing said direct drive to permit said driven shaft to overrun said driving shaft, means including a shiftable clutch device driven by one of said shafts and adapted to selectively provide said shafts with a one-way or two-way direct drive, and means including a gear train for driving said driven shaft from said drive shaft at a speed ratio different from said releasable direct drive, said speed ratio driving means including driving and driven members respectively adapted for driving connection with said shafts, said speed ratio driving means further including relatively movable clutching structures respectively connected to said driving and driven members and adapted when engaged to provide a drive through said gear train, said sets of clutch teeth being so constructed and arranged as to synchronize the speeds of rotation of said shafts during shifting movement of said clutch device to provide said two-way direct drive.

16. In a motor vehicle power transmission, a driving shaft, a driven shaft, overrunning clutch means including driving and driven clutch elements respectively adapted for driving connection to said driving and driven shafts for transmitting a releasable one-way direct drive therebetween, indirect speed ratio driving means for driving the driven shaft from said driving shaft around said overrunning clutch means, said indirect driving means including driving and driven elements respectively adapted for driving connection to said driving and driven shafts, and shiftable clutch means for operably connecting said shafts for a two-way direct drive therebetween, said shiftable clutch means including a shiftable clutching member continuously drivingly connected to one of said shafts and releasably drivingly connecting one of said overrunning clutch elements and one of said indirect elements to the last said shaft, and means responsive to shifting of said shiftable clutching member for synchronizing the speeds of said shafts prior to establishment of said two-way drive.

17. In a power transmission mechanism, a drive shaft, a driven shaft, an annulus gear adapted to be driven from said drive shaft and at a speed faster than that of said drive shaft, means drivingly connected to said driven shaft and shiftable relatively thereto for selectively establishing a direct drive and an overdrive from said drive shaft to said driven shaft, said shiftable means including two sets of teeth for alternate positive clutching with said annulus gear and with said drive shaft, only one of said sets of clutch teeth being clutched as aforesaid at any time, and means preventing clutching of said shiftable means with said drive shaft to establish a positive drive connection between said shafts until said drive shaft is synchronized with said set of teeth to be clutched therewith when said shiftable means is shifted to release the overdrive and establish the direct drive.

18. In a power transmission mechanism, a drive shaft, a driven shaft, an annulus gear adapted to be driven from said drive shaft at a speed faster than that of said drive shaft, means drivingly connected to said driven shaft and shiftable relatively thereto for selectively establishing a direct drive and an overdrive from said drive shaft to said driven shaft, said shiftable means including two sets of teeth for alternate positive clutching with said annulus gear and with said drive shaft, only one of said sets of clutch teeth being clutched as aforesaid at any time, means preventing clutching of said shiftable means with said drive shaft to establish a positive drive connection between said shafts until said drive shaft is synchronized with said set of teeth to be clutched therewith when said shiftable means is shifted to release the overdrive and establish the direct drive, and manually operable means controlling shifting of said shiftable means.

19. In a power transmission mechanism, a driving shaft; a driven shaft; an internal gear adapted to be driven from said driving shaft and at a speed different from that of said driving shaft; a set of internal clutch teeth directly drivingly connected with said internal gear; means drivingly connected to said driven shaft and shiftable relatively thereto for selectively establishing a direct drive and an overdrive from said driving shaft to said driven shaft; said shiftable means carrying a set of external clutch teeth for positive clutching with said internal clutch teeth and a second set of clutch teeth for positive clutching with said driving shaft, only one of said shiftable sets of clutch teeth being clutched as aforesaid at any time; and means preventing clutching of the second said set of clutch teeth with said driving shaft to establish a positive drive connection between said shafts until said driving shaft is synchronized with the second said set of clutch teeth when said shiftable means is shifted to release the overdrive and establish the direct drive.

WILLIAM T. DUNN.
AUGUSTIN J. SYROVY.
ROY T. BUCY.